United States Patent [19]

Omori et al.

[11] Patent Number: 4,750,514

[45] Date of Patent: Jun. 14, 1988

[54] FUEL CONTROL SOLENOID VALVE ASSEMBLY FOR USE IN FUEL INJECTION PUMP OF INTERNAL COMBUSTION ENGINE

[75] Inventors: Toshihiko Omori, Kariya; Masahiko Miyaki, Oobu; Hitoshi Tomishima, Kariya, all of Japan

[73] Assignee: Nippondenso Co., Ltd., Kariya, Japan

[21] Appl. No.: 943,768

[22] Filed: Dec. 19, 1986

[30] Foreign Application Priority Data

Dec. 25, 1985 [JP] Japan ................................ 60-295646

[51] Int. Cl.$^4$ ............................................. F16K 31/06
[52] U.S. Cl. .............................. 137/339; 251/129.16;
  251/129.18; 251/129.19
[58] Field of Search ...................... 251/129.07, 129.16,
  251/129.18, 129.19; 137/339, 340

[56] References Cited

U.S. PATENT DOCUMENTS 3,368,791  2/1968  Wells ................................ 251/129.07
3,472,483 10/1969  Janczur ............................ 251/129.07
4,480,619 11/1984  Igashira et al. .

FOREIGN PATENT DOCUMENTS 55-139965 10/1980  Japan .
59-155568  9/1984  Japan .
 2048373 12/1980  United Kingdom .

Primary Examiner—Arnold Rosenthal
Attorney, Agent, or Firm—Cushman, Darby & Cushman

[57] ABSTRACT

Disclosed is a solenoid valve assembly for use in an fuel injection pump of a motor vehicle basically comprising an electromagnetic actuator section including a stator, a core and a winding and a valve section having a valve for interrupting flow of fuel in a fuel passage. A rod-like member is coupled between the valve and the core and is movable within a guide hole made at the center of the stator so that the movement of the core is transmitted to the valve. The valve is biased by a spring in a direction closing the fuel passage. The valve is actuated to open the fuel passage in response to energization of the winding and is actuated to close the fuel passage in response to deenergization of the winding, the opening degree of the valve being regulated and adjusted by a stopper. The spring and the stopper is provided at a high pressure side of the fuel passage communicating with a compression chamber of the fuel injection pump.

14 Claims, 5 Drawing Sheets

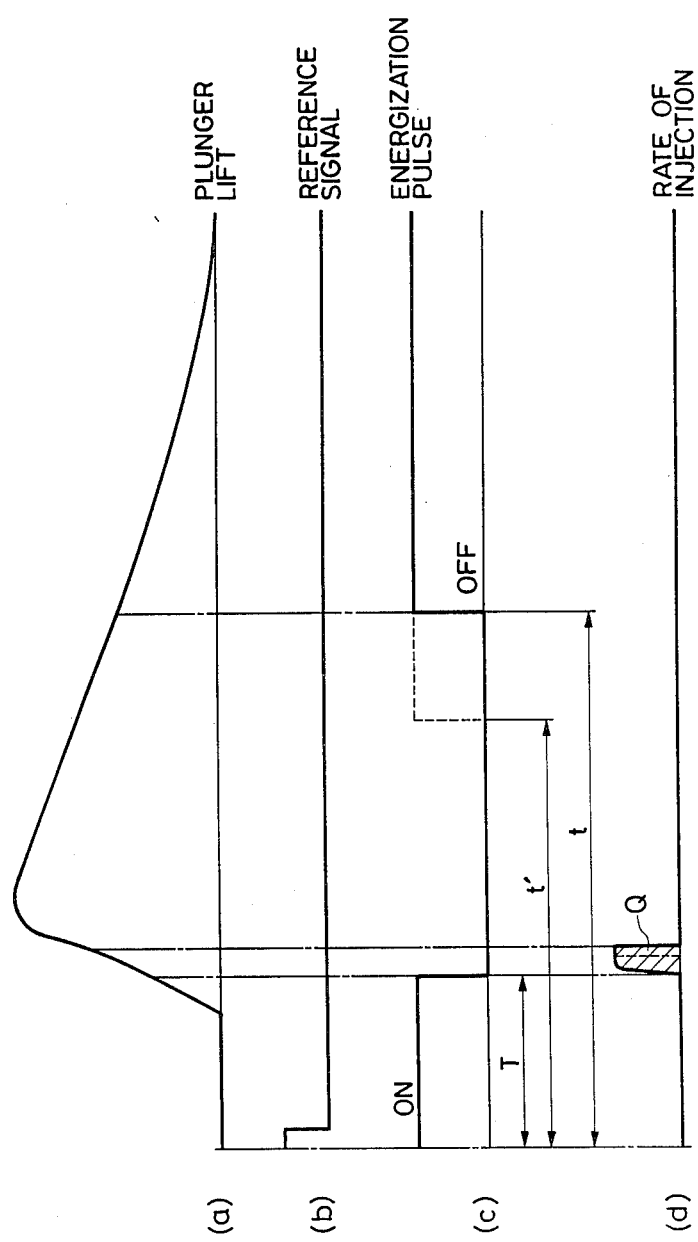

FUEL CONTROL SOLENOID VALVE ASSEMBLY FOR USE IN FUEL INJECTION PUMP OF INTERNAL COMBUSTION ENGINE

BACKGROUND OF THE INVENTION

The present invention relates generally to a fuel control solenoid valve used in a fuel injection pump of an internal combustion engine such as a diesel engine, more particularly to such a fuel control solenoid valve for optimally controlling the quantity of fuel injection into cylinders of the engine and the timing of the fuel injection thereinto.

It is known in the art of fuel injection timing control that a fuel injection timing is controlled by closing a high pressure chamber of a fuel injection pump. One example of such a fuel injection timing control system is disclosed in Japanese patent Provisional Publication No. 59-155568, the teachings of which involves controlling the fuel injection timing by closing a solenoid-operated valve after the elapse of either a predetermined time period or cam angle from the generation of the output signal of a reference angle sensor occuring at a given interval within the engine operating cycle, the solenoid-operated valve being provided in a passage establishing the communication between the high pressure chamber and low pressure side of the fuel injection pump. This known system is simple in construction as compared with a conventional method of mechanically controlling the fuel injection timing, and is also suitable for electronic control.

There is a problem which arises with such a high pressure chamber-closed type system, however, in that difficulty has been encountered to maintain the valve-closed state withstanding the pressure of up to 800 kg/cm$^2$ in a line type pump or the pressure of up to 1500 kg/cm$^2$ in a unit injector in which a pump and a nozzle are integrally constructed as a one-piece unit, and to readily manufacture a solenoid-operated valve with high reliability which is capable of operating with valve closing responsibility of 1500 Hz at maximum in accordance with speeds of the engine.

One possible solution is to use an externally opening type solenoid-operated valve as disclosed in Japanese patent Provisional Publication No. 55-139965. However, this prior art technique does not produce satisfactory results for meeting requirements in terms of adjustment of the valve lifting amount and the valve closing force and build-in of the valve.

SUMMARY OF THE INVENTION

The present invention has been developed in order to eliminate the above-mentioned drawbacks inherent to the high pressure chamber closing type fuel injection devices.

It is therefore an object of the present invention is to provide a new and improved fuel control solenoid valve which is small in size and which can withstand a high pressure with high response and high reliability.

Another object of the invention is to provide a fuel control solenoid valve which is capable of resulting in easy adjustment of the valve lifting amount and the valve closing force and resulting in easy manufacturing.

A solenoid valve assembly for use in an fuel injection pump of a motor vehicle according to the present invention basically comprises an electromagnetic actuator section including a stator, a core and a winding and a valve section having a valve for interrupting flow of fuel in a fuel passage. A rod-like member is coupled between the valve and the core and is movable within a guide hole made at the center of the stator so that the movement of the core is transmitted to the valve. The valve is biased by a spring in a direction closing the fuel passage. The valve is actuated to open the fuel passage in response to energization of the winding and is actuated to close the fuel passage in response to deenergization of the winding.

According to a feature of the present invention, the opening degree of the valve is regulated and adjusted by a stopper. The spring and the stopper is provided at a high pressure side of the fuel passage communicating with a compression chamber of the fuel injection pump. The rod-like member is fixedly secured to the core and separably coupled to the valve.

BRIEF DESCRIPTION OF THE DRAWINGS

The object and features of the present invention will become more readily apparent from the following detailed description of the preferred embodiments taken in conjunction with the accompanying drawings in which:

FIG. 5 is a timing chart for describing the operation of the fuel injection apparatus of FIG. 4.

DETAILED DESCRIPTION OF THE INVENTION

Figure 1:
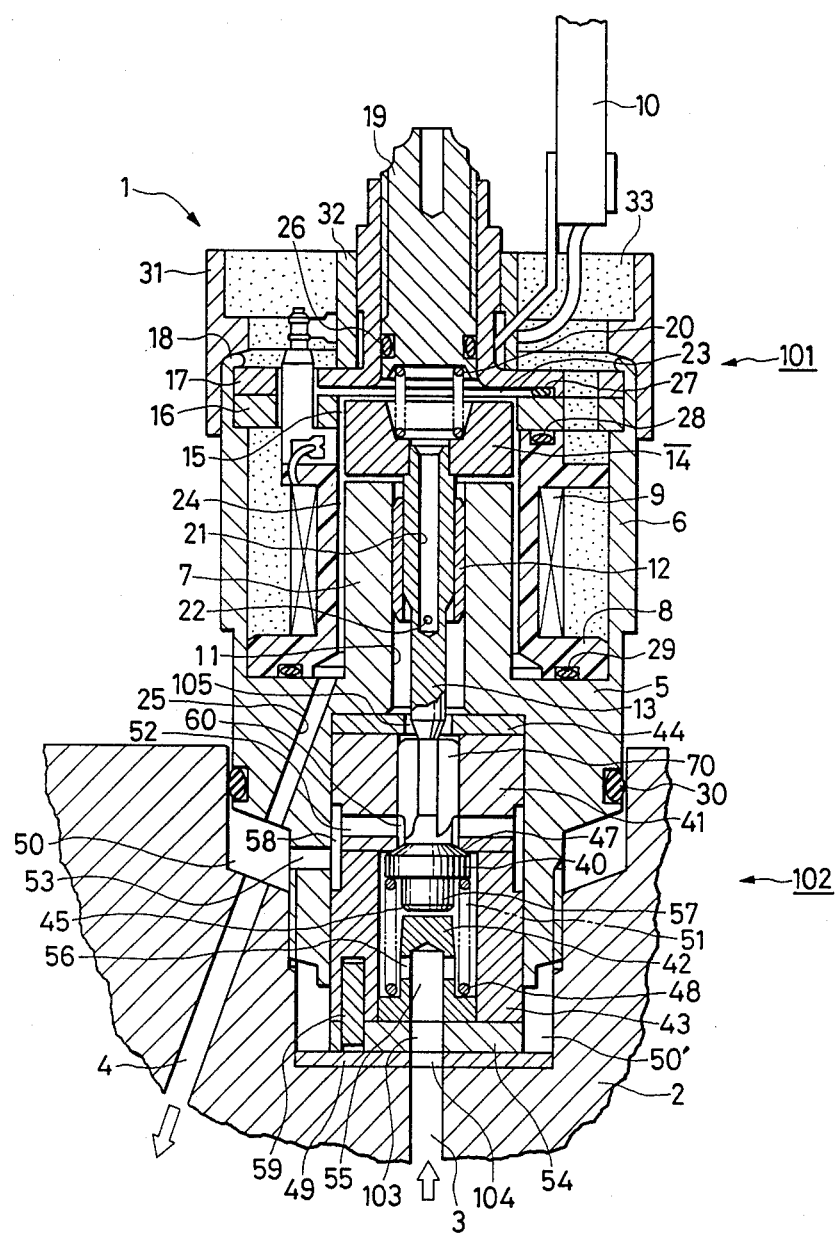
FIG. 1 is a cross-sectional view of a solenoid valve assembly according to an embodiment of the present invention.

Referring now to FIG. 1, there is illustrated a solenoid-operated valve assembly according to an embodiment of the present invention.

The solenoid-operated valve designated at reference numeral 1 is mounted on a body 2 of a unit injector of a diesel engine. A high pressure passage 3 communicates with a high pressure chamber of a plunger pump, not shown, while a spill passage 4 communicates with a low pressure housing of the injector, not shown. The solenoid-operated valve 1 has a cylindrical and symmetrical configuration, and various parts are installed in a housing 5 which also functions as a member forming a magnetic circuit of an electromagnetic solenoid. At an upper portion of the housing 5 is installed an electromagnetic actuator section 101 which acts as an electromagnetic solenoid, and at a lower portion of the housing 5 is provided a valve section 102 which interrupts flow of fuel under high pressure.

The structure of the electromagnetic actuator section 101 will be described hereinbelow.

An upper outer cylindrical portion of the housing 5 forms a yoke portion 6 of the electromagnetic solenoid, while an upper inner cylindrical portion of the same forms a stator portion 7 of the electromagnetic solenoid. Between the yoke portion 6 and the stator portion 7 is fitted an electromagnetic solenoid comprising a coil bobbin 8 formed of a resin and a winding 9. The winding 9 is coupled through a lead ires 10 to an electronic control apparatus, not shown. At the axis portion of the stator portion 7 is made a guide hole 11 in which a bushing member 12 made of a hard material is fixed after being inserted therein under pressure. By the bushing member 12 is supported a shaft-shaped rod-like member 13 to be slidable axially. The rod-like member 13 is made of a nonmagnetic material and its sliding surface and a lower end which comes into contact with a valve member are respectively hardened. At an upper portion of the rod-like member 13 is fixed an annular core 14 which is positioned so as to face an upper end surface of the stator portion 7. Around the core 14 is provided an annular stator plate 16 with a given circumferential space 15 therebetween. The stator plate 16 and a top plate 17 are securely fixed to the housing 5 with a flange portion 18 of an upper portion of the yoke 6. The stator plate 16 and the yoke portion 6 are magnetically coupled, and a magnetic circuit for the winding 9 is such that flux returns, through the stator portion 7 fitting the coil bobbin 8 therein, space, the core 14, circular gap 15, the stator plate 16, yoke portion 6, to the stator portion 7. The core 14 is attracted to the stator portion 7 in response to energization of the winding 9.

A center portion of the top plate 17 is threaded so that an adjusting screw 19 is screwed thereinto. Between the adjusting screw 19 and the core 14 is provided a compression spring 20 which biases the core 14 and the rod-like member 13 downwardly in the drawing. This spring 20 opposes a first spring 48 biasing a valve in a closing direction, and will be referred to as a second spring hereinafter.

In the rod-like member 13 are made a long hole 21 extending axially and having an open end at its upper end and a small hole 22 meeting the long hole 21 at right angles so as to establish communication between a space 23 above the core 14 and a space defined by the guide hole 11 below the bushing member 12. On the inner surface of the coil bobbin 8 are formed a number of grooves 24 in axial direction to form a gap like passage which communicate between flange surfaces at the upper and lower ends of the coil bobbin 8. in the housing 5 are formed an oblique hole 25 which couples the number of grooves 24 with the spill passage 4. Therefore, the guide hole 11 below the bushing member 12 communicates, via the small hole 22, long hole 21, space 23 above the core, circumferential gap 15, the number of grooves 24 and oblique hole 25, with the spill passage 4. In order to hermetially seal the communicating passage, O-rings 26, 27, 28 and 29 are respectively positioned coaxially between the top plate 17 and the adjusting screw 19, between the top plate 17 and the stator plate 16, between the stator plate 16 and the upper flange portion of the coil bobbin 8, and between the lower flange portion of the coil bobbin 8 and the housing 5, centering the axis of the rod-like member 13. In addition, another O-ring 30 is positioned between the body 2 of the unit injector and the housing 5 so that the pump is assembled hermetically.

To an upper end of the housing 5 is telescopically fitted a cover ring 31, and spaces in the housing 5 outside the O-rings 26–29, such as those between the cover ring 31 and the ring 32 and between the winding 9 and the housing 5, are all fitted with an epoxy resin 33 so that no space is left, thereby the mechanical strength is bettered while the heat from the winding 9 is effectively dissipated.

Secondly, the structure of the valve portion 102 will be described hereinbelow.

The valve portion 102 basically comprises a valve needle 40, a valve seat 41, a stopper 42 for regulating and adjusting the lifting or moving amount of the valve needle 40, and a spacer 43.

Into a cylindrical recess at the lower portion of the housing 5 are fitted a spacer 44 for adjusting assembling dimention in an axial direction, the cylindrical valve seat 41 and the cylindrical spacer 43. In a cylindrical longitudinal hole inside the valve seat 41, the valve needle 40 is fitted to form a seat portion 47 such that the valve needle 40 is slidable in the axial direction and one end thereof comes into contact with a corner of the longitudinal hole of the valve seat 41 so as to maintain hermetial sealing. The valve needle 40 is not fixedly secured to the rod-like member 13 but is coupled thereto, and is biased by a compression valve spring 48 upwardly in the drawing, i.e., in the seat portion closing direction. The lower end of the valve spring 48 is supported by the stopper 42 which defining therein a fuel passage recess 55 and through-hole 56. When the valve needle 40 is moved downwardly in the drawing, an upper surface of the stopper 42 is arranged so as to come into contact with a lower surface 45 of the valve needle 40 and to stop the movement thereof. The moving amount of the valve needle 40 can be adjustable by changing the longitudinal, i.e., axial length of the spacer 43.

In the longitudinal cylindrical hole inside the spacer 43, the stopper 42 is supported by a packing 54 which comes into contact with a lower surface of the spacer 43 positioned downwardly in the drawing. The position of the packing 54 with respect to the spacer 43 is determined by a pin 59. When the solenoid valve 1 is mounted on the body 2, the lower end of the packing 54 is mounted on an annular seat plate 49 fixedly secured to the body 2 with the lower end being pressed, and thus spaces 50, 50' communicating with the spill passage 4 and the high pressure passage 3 are defined and sealed. Holes 103 and 104 are coaxially difined in the packing 54 and seat plate 49 so as to communicate a valve spring chamber 51 surrounded by the spacer 43, valve needle 40 and stopper 42 with the high pressure passage 3. Here, although the packing 54 and spacer 43 are shown in FIG. 1 as being separated in construction, it is also appropriate that they are integrally constructed as one-piece unit.

In the valve seat 41 a plurality of passage holes 52 are defined in order to communicate an annular groove defined in the valve needle 40 with an oil gallery 58. The oil gallery 58 is communicated via a plurality of lateral holes 53 with a space 50. The compression valve spring 48 corresponds to the above-mentioned second spring 20 and will be hereinafter referred to as first spring 48. The upper end portion 105 of the valve needle 40 comes into contact with the lower end of the rod-like member 13, that is, both are separable from each other, and is pressed thereto. As described above, the rod-like member 12 is urged downwardly by means of the second spring 20, and as a result the valve needle 40 is biased by a resultant force (differntial pressure) of the first and second springs 48 and 20 in the upward direction in the drawing so as to close the seat portion 47. The spring constants of the first and second spring 48 and 20 are equal to each other, and the set lengthes of the first and second spring 48 and 20 are varied by changing the set length of the second spring 20 by the aid of the adjustment of the adjusting screw 19 so that the biasing force upwardly can be obtained due to the occurrence of difference between their spring pressures.

At the side surface of the valve needle 40 a notch 70 is made, so that the annular groove 60 provided at the downstream of the valve seat portion 47 is communicated with a guide hole 11 of the electromagnetic actuator section. Therefore, fuel passing through the valve seat portion 47 is spilled from the annular groove 60 through the passage holes 52, oil gallery 58, lateral hole 53 of the housing 5 to the space 50 and spill passage 4, or is spilled via the notch 70, guide hole 11, small hole 22 and long hole 21 of the rod-like member 13, space 23 provided above the core 14, circumferntial gap 15 between the core and stator plate 16, grooves 24, and oblique hole 25 to the spill passage 4.

Preferably, the lift amount is smaller than 0.5 mm while the valve needle 40 is opened, and the thichness of the spacer 44 is determined so that the length between the core 14 and stator portion 7 is about 0.1 mm.

The solenoid valve assembly of FIG. 1 operates as follows.

Under a free state where the winding 9 is not being energized and no hydraulic pressure is applied to the high pressure passage 3, the valve needle 40 is raised upwardly by the resultant force of the first and second springs 48 and 20 and hence the valve seat portion 47 is closed as shown in FIG. 1.

During energization of the winding 9 the core 14 is attracted to the stator portion 7, and therefore the rod-like member 13 presses down the valve needle 40 to open the valve seat portion 47. Fuel within the high pressure passage 3 supplied from an unshown unit injector under pressure enters the valve spring chamber 51 and reach the annular groove 60 via a flow passage provided in response to the opening of the valve seat portion 47. Thereafter, as described above, the fuel is spilled from the annular groove 60 through the passage holes 52, oil gallery 58, lateral hole 53 of the housing 5 to the space 50 and spill passage 4, or is spilled via the notch 70, guide hole 11, small hole 22 and long hole 21 of the rod-like member 13, space 23 provided above the core 14, circumferntial gap 15 between the core and stator plate 16, grooves 24, and oblique hole 25 to the spill passage 4.

Here, considering the force applied to the valve nedle 40 upwardly and downwardly, the attraction force to the core 14 caused by the stator portion 7 acts downwardly (opening direction), while the resultant force of the first and second spring 48, 20, the hydraulic pressure within the valve spring chamber 51 applied to a pressure-receiving area with a circle whose diameter is equal to that of the valve seat 41, and the biasing force of the valve spring 48 act upwardly (closing direction). The hydraulic pressure within the valve spring chamber 51 is due to only the throttling action of the seat portion 47 when the seat portion 47 is in the opened condition, and therefore the hydraulic pressure in the upward direction, i.e., the force pressing up the valve needle 40, is relatively small, resulting in certainly enabling opening the seat portion 47 in response to a small attracted force of the core 14. This allows the electromagnetic actuator section 101 to be small-sized. Furthermore, when fuel within the valve spring chamber 51 is spilled from the seat portion 47 via the notch 70, guide hole 11, small hole 22 and long hole 21 of the rod-like member 13, space 23 provided above the core 14, circumferntial gap 15 between the core and stator plate 16, grooves 24 and oblique hole 25 to the spill passage 4, the fuel takes heat away from the coil bobbin to facilitate heat dissipation from the winding 9.

In response to the stopping of energization to the winding 9, the core attracting force disappears, and the valve needle 40 which has been pressed by the rod-like member 13 quickly rises with the resultant force of the first and second springs 48, 20 and the hydraulic pressure applied to the seat portion 47, thereby closing the seat portion 47 so that the valve spring chamber 51, the portion communicated with the high pressure passage 3, lateral hole 56, longitudinal hole 55 and hole 103 portion of the packing 54 are closed.

A brief description will be made hereinbelow in terms of the operation of a unit injector including the above-described solenoid valve assembly 1.

Figure 2:
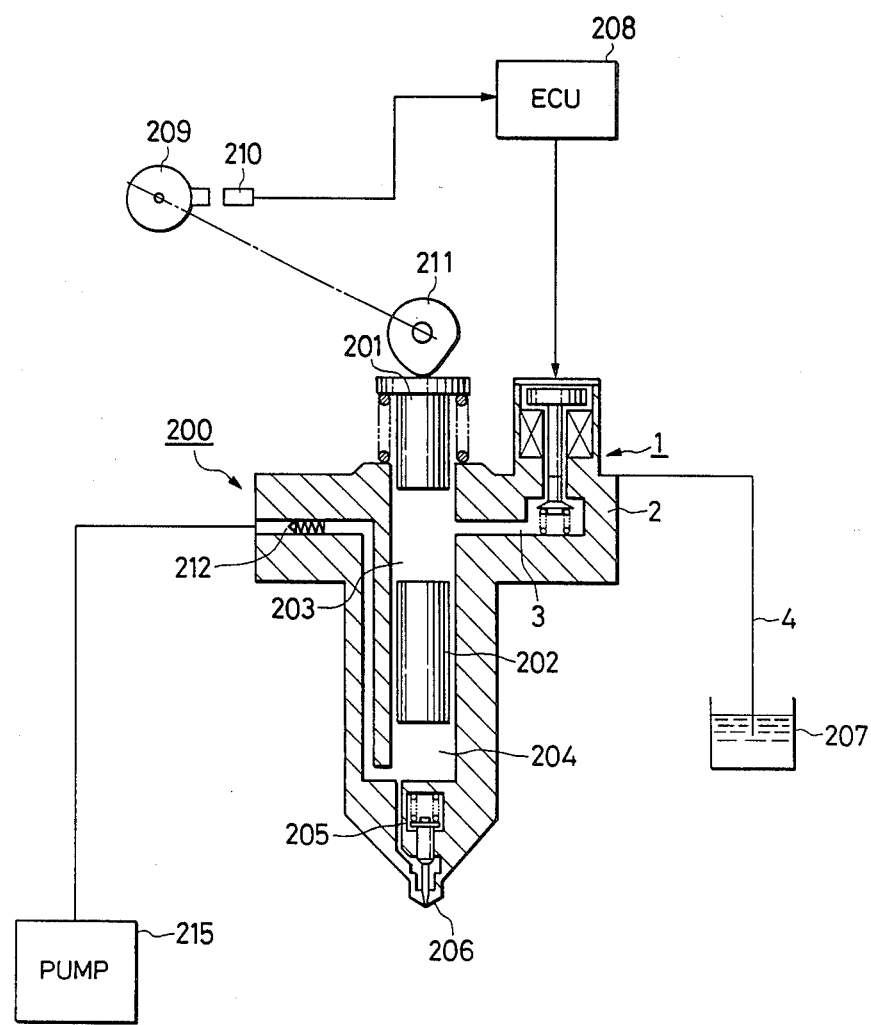
FIG. 2 is a schematic diagram showing a fuel injection apparatus including the solenoid valve assembly of FIG. 1.

FIG. 2 is a schematic diagram of the entire structure of a fuel injection apparatus through simplification.

Fuel is supplied by the amount in advance required for injection from a pump 215 through a check valve 212 into an injection pump chamber 204 of a unit injector 200. A compression plunger 201 compresses, due to the operation of a cam 211, fuel within a chamber 203. When the solenoid valve 1 is in the opened condition, the fuel within the chamber 203 is spilled through a passage 3, the solenoid valve 1 and a passage 4 into a tank 207. When the solenoid valve 1 is set to the closed condition in the midst of movement of the compression plunger 201 downwardly in the drawing, the fuel within the chamber 203 is pressed and the pressure within the chamber 203 increases to press an injection plunger 202 downwardly in the drawing. As a result, the pressure within the injection pump chamber 204 becomes high so that the fuel fed in advance is injected into an engine combustion chamber, not shown, from an injection nozzle 206 through a passage 205. Open/close control of the solenoid valve 1 is performed by an electronic control unit (ECU) 208 including a microcomputer. It is arranged that a reference signal is inputted to the electronic control apparatus 208 at each bottom dead center by means of a pulse generating unit 109 attached coaxially to the cam 211 and a reference signal detector 210.

Figure 3:
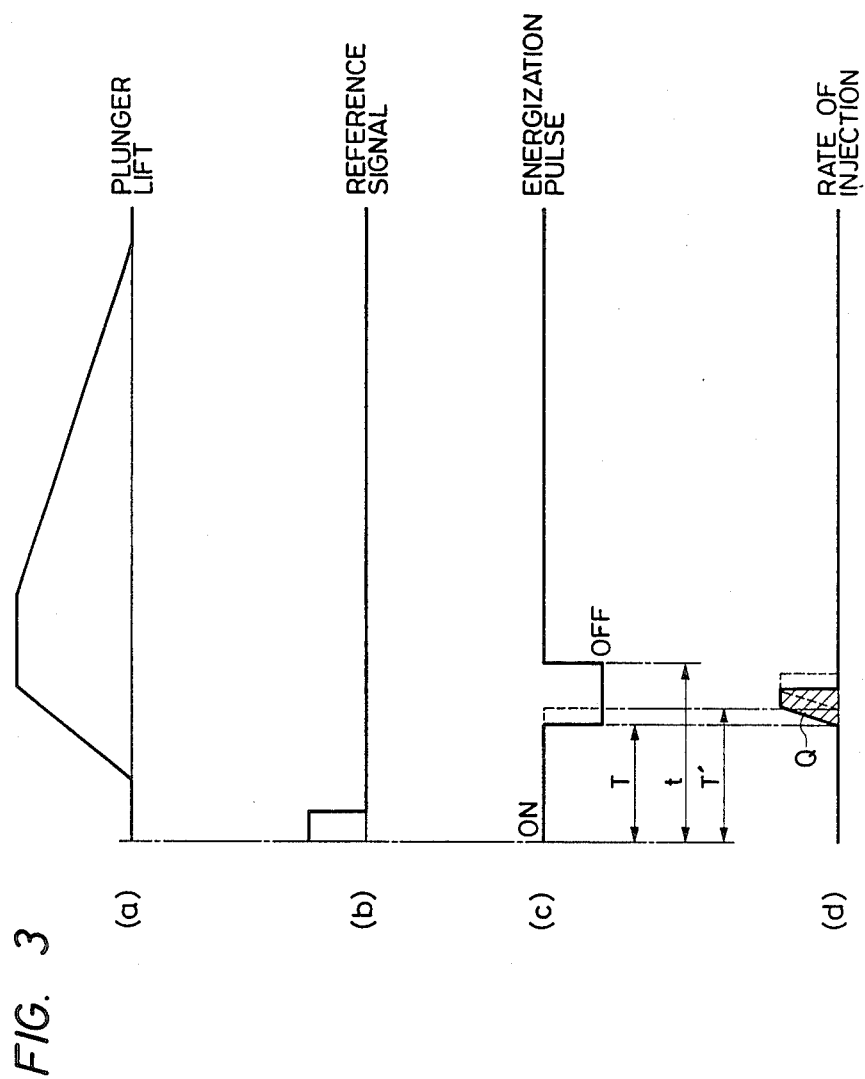
FIG. 3 is a timing chart for describing the operation of the fuel injection apparatus of FIG. 2.

FIG. 3 is a timing chart showing the operation, and in the drawing the reference character (a) represents a lift amount of the compression plunger 201; character (b) designates a reference signal; character (c) depicts an energization pulse fed to the solenoid valve 1; and character (d) is the rate of injection from the injection nozzle 206.

When the electronic control unit 208 terminates the energization of the solenoid valve 1 to cause the same to close after a given rotational angle of the engine from the generation of the reference signal, actually after a period of time T has elapsed with the rotational angle being converted into time period within the electronic control unit 208, the injection of the fuel under high pressure is started. By changing the closing timing (T') of the solenoid valve 1, fuel injection timing can be controlled. Then, after a given period of time "t", the solenoid valve 1 is energized again in order to open its valve to be prepared for subsequent fuel injection.

Figure 4:
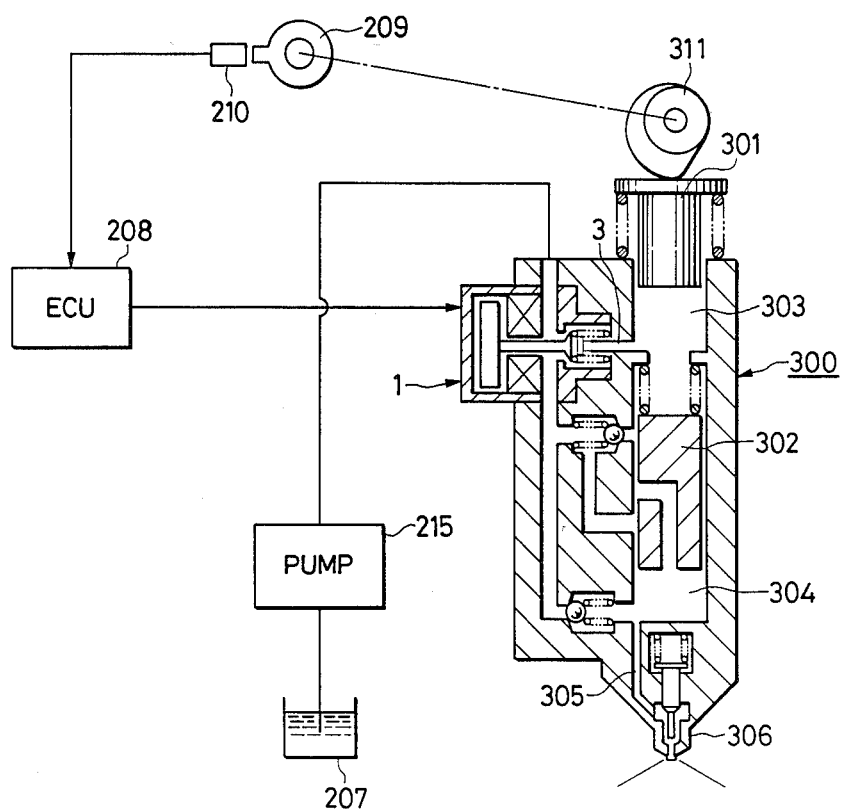
FIG. 4 is schematic diagram showing another fuel injection apparatus including the solenoid valve assembly.

FIG. 4 shows another unit injector. A required amount of fuel is filled in an injection pump chamber 304 of a unit injector 300 during the time period of the closing of the solenoid valve 1. A compression plunger 301 compresses, due to the operation of a cam 311, fuel within a compression pump chamber 303. The fuel within the compression pump chamber 303 is spilled through a passage 3 when the solenoid valve 1 is in the opened state. In response to closing of the solenoid valve 1, the fuel within the compression pump chamber is pressed to rise the pressure within the compression pump chamber 303. As a result, an injection plunger 302 is pressed downwardly to increase the pressure within the injection pump chamber 304 so that the fuel is injected into an engine combustion chamber, not shown, from a nozzle 306 by way of a passage 305.

After the termination of the injection, when the solenoid valve 1 is set to the closed state in the midst of movement of the compression plunger upwardly in the drawing, the pressure within the compression pump chamber 303 becomes negative and hence the injection plunger 302 is drawn in the upward direction of the drawing to cause fuel to be sucked in the injection pump chamber 304. In response to the opening of the solenoid valve 1 immediately after a required amount of fuel is sucked in the injection pump chamber 304, the pressure within the compression pump chamber 303 becomes positive and hence the rising of the injection plunger 302 is stopped to complete the determination of amount of fuel. Open/close control of the solenoid valve 1 is performed by an electronic control unit (ECU) 208 including a microcomputer. It is arranged that a reference signal is inputted to the electronic control unit 208 at each bottom dead center by means of a pulse generating unit 209 attached coaxially to the cam 311 and a reference signal detector 210.

FIG. 5 is a timing chart showing the operation, and in the drawing the reference character (a) represents a lift amount of the compression plunger 301; character (b) designates a reference signal; character (c) depicts an energization pulse fed to the solenoid valve 1; and character (d) is the rate of injection from the injection nozzle 306.

When the electronic control unit 208 terminates the energization of the solenoid valve 1 to cause the same to close after a given rotational angle of the engine from the generation of the reference signal, actually after a period of time T has elapsed with the rotational angle being converted into time period within the electronic control unit 208, the injection of the fuel under high pressure is started. After a given period of time "t" from the termination of injection of the required amount of fuel, the solenoid valve 1 is energized again in order to open its valve and to determine a fuel amount necessary for injection. By changing the opening timing of the solenoid valve 1, the fuel injection timing is controlled. Then a subsequent fuel injection is prepared.

In the above-mentioned embodiment although the solenoid valve according to the present invention is employed for a unit injector, it is also appropriate to employ it an apparatus of the type wherein, for example, an injection pump and an injection nozzle are separated from each other. Particularly, when the solenoid valve according to the present invention is employed for a distribution member of a distribution type pump, it is possible to control the fuel injection timings and injection amounts for multi-cylinders using single solenoid valve.

The present invention has the following advantages in addition to those described above.

(1) Since the core 14 is biased upwardly, i.e., valve-closing direction by means of the springs 20 and 48, valve closing time lag of the valve needle 40 due to residual magnetism of the stator portion 7 is small, and thus valve response becomes satisfactory.

(2) Since spring means for biasing the valve needle 40 in the closing firection comprises the first spring 48 and second spring 20 both having identical spring constant, and since a biasing force is applied to the vlave needle 40 in the closing direction by way of the difference between spring forces caused from the difference in the set lengths of the two springs which are used to bias the valve needle 40 so that the springs oppose each other, it is expected that the first spring 48 and the second spring 20 will change in connection with secular change, and hence the biasding force, which influences sensitively on the response of the solenoid valve, can be held stably for a long period of time thereby providing an advantage that responsde characteristic of a solenoid valve is maintained for a long period of time.

(3) Since the adjusting screw 19 for adjusting the set length of the second spring 20 is provided, the force of biasing the valve needle 40 can be adjusted precisely thereby reducing variation in response time throughout a number of products.

(4) Since fuel flowing out of the valve is arranged to pass through the number of grooves 24 provided on the inner surface of the coil bobbin 8, the coil bobbin 8 is cooled by the passing fuel to facilitate dissipation of heat from the winding 9.

(5) Since the passage for the fuel flowing out of the valve is formed within a space hermetically defined by a plurality of O-rings 26 to 29, which are coaxially arranged centering the axis of the valve, at a portion inside the O-rings 26 to 29, the winding 9 to be energized can be kept in dry state without being exposed to oil, and therefore electrical treatment in installation such as insulation treatment is easy.

(6) Since the valve portion 102 is arranged such that the lift adjustment can be performed only by the valve portion, it is possible that the valve portion 102, which is a mechanical product, and the electromagnetic actuator 101, which is an electrical product, are respectively manufactured and assembed independently, and these are assembled into a signal unit. Therefore, it is very advantageous in view of manufacturing process.

The above-described embodiment is just an example of the present invention, and therefore, it will be apparent for those skilled in the art that many modifications and variations may be made without departing from the scope of the present invention.

What is claimed is:

1. A solenoid valve assembly for use in a fuel injection pump of an internal combustion engine for opening and closing a fuel passage, comprising:

(a) an electromagnetic actuator section having a core, a winding, and a stator portion, which act as an electromagnetic solenoid and form a magnetic circuit; and (b) a valve section positioned apart from said electromagnetic actuator section and having a valve for interrupting flow of fuel, said valve being biased by a spring in a direction closing said fuel passage; and (c) a rod-like member coupled between said valve and said core so that the movement of said core is transmitted to said valve and movable within a guide hole made at the center of said stator portion;

wherein said valve is actuated to open said fuel passage in response to energization of said winding and is actuated to close said fuel passage in response to deenergization of said winding, the opening degree of said valve being regulated by a stopper, said spring and said stopper being provided at a high pressure side of said fuel passage communicating with a compression chamber of said fuel injection pump.

2. A solenoid valve assembly as claimed in claim 1, wherein said rod-like member is fixedly secured to said core and separably coupled to said valve.

3. A solenoid valve assembly as claimed in claim 2, further comprising a second spring for biasing said core and said rod-like member in the direction opening said valve, said valve being biased in the valve-closing direction by the resultant force of said first-mentioned spring and said second spring.

4. A solenoid valve assembly as claimed in claim 3, wherein spring constants of said first and second springs are identical to each other, the resultant force of said first and second springs being varied by changing the set length of said first or second spring.

5. A solenoid valve assembly as claimed in claim 2, wherein said rod-like member is made a nonmagnetic material, and hardening is effected at a sliding surface thereof and at a portion thereof to be contact with a portion of said valve.

6. A solenoid valve assembly as claimed in claim 1, further comprising a bushing member made of a hard material, said bushing member being interposed between a guide hole defined at the center of said stator portion and said sliding surface of said rod-like member.

7. A solenoid valve assembly as claimed in claim 3, further comprising an adjusting screw for changing the set length of said second spring by an external operation.

8. A solenoid valve assembly as claimed in claim 1, wherein said stopper is arranged so that the opening degree of said valve is smaller than 0.5 mm.

9. A solenoid valve assembly as claimed in claim 1, wherein said valve section is encased in a housing of said electromagnetic actuator section, said valve section and said electromagnetic actuator section being independently assembled.

10. A solenoid valve assembly as claimed in claim 1, wherein an axially extending long hole opened to the head of said core and a small hole intersecting at right angles and communicating with said long hole are defined in the axial portion of said core and said rod-like member so that an upper stream portion and a lower stream portion of said rod-like member are communicated with each other to form a passage from said valve, said small hole being opened at a lower portion of said rod-like member.

11. A solenoid valve assembly as claimed in claim 1, wherein a circumferential gap is provided around said core, a gap-like passage being provided to be continuous from said circumferential gap between said stator portion and a coil bobbin telescopically engaged to surround said staor portion, a hole for communicating between said gap-like passage and the outside of said valve being provided so that said gap-like passage and said hole are used for communicating an upper portion of said core with the outside of said solenoid valve assembly to form a passage from said valve.

12. A solenoid valve assembly as claimed in claim 11, wherein said gap-like passage provided between said stator portion and said coil bobbin is formed of a number of grooves made axially on an inner surface of said coil bobbin.

13. A solenoid valve assembly as claimed in claim 10, wherein said passage communicating between said valve and the outside of said solenoid valve assembly is formed in a space which is hermetically limited by a plurality of O-rings coaxially arranged centering the axis of said valve among a housing of said electromagnetic actuator section, flange portions provided at both end surfaces of said coil bobbin.

14. A solenoid valve assembly as claimed in claim 1, wherein a plurality of passage holes are defined in a seat member of said valve section in directions perpendicular to the axis of said valve to establish communication between said valve section and the outside of said solenoid valve assembly.

* * * * *